(12) United States Patent
Nakamura (10) Patent No.: US 9,036,197 B2
(45) Date of Patent: May 19, 2015

(54) DATA TRANSFER CONTROL APPARATUS AND DATA TRANSFER CONTROL METHOD

(71) Applicant: CANON KABUSHIKI KAISHA, Tokyo (JP)

(72) Inventor: Hironori Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/330,994

(22) Filed: Jul. 14, 2014

(65) Prior Publication Data

US 2015/0022860 A1    Jan. 22, 2015

(30) Foreign Application Priority Data

Jul. 16, 2013   (JP) ................................. 2013-147907

(51) Int. Cl.
*G06F 15/00*    (2006.01)
*G06F 1/00*     (2006.01)
*G06K 1/00*     (2006.01)
*G06F 13/28*    (2006.01)
*G06K 15/02*    (2006.01)

(52) U.S. Cl.
CPC ............ *G06F 13/28* (2013.01); *G06K 15/1886* (2013.01)

(58) Field of Classification Search
CPC ........................... G06F 13/28; G06K 15/1886
USPC ........................................ 358/1.1, 1.16, 1.15
See application file for complete search history.

(56) References Cited

U.S. PATENT DOCUMENTS

2007/0041766 A1*  2/2007  Imai ......................... 400/120.01
2014/0375714 A1* 12/2014  Otsuki .............................. 347/9

FOREIGN PATENT DOCUMENTS

JP    H08-166921 A    6/1996

* cited by examiner

*Primary Examiner* — Douglas Tran
(74) *Attorney, Agent, or Firm* — Canon U.S.A., Inc. IP Division (57) ABSTRACT

In order to control transfer to a processing unit of input data containing a plurality of lines stored across a plurality of memory regions including first and second memory regions, a position of a line of target of output data containing a plurality of lines output from the processing unit is specified. A number of lines of input data to be transferred from the first memory region and their addresses are determined, and a number of lines of input data to be transferred from the second memory region and their addresses are determined, based on the specified position of the line of target. Control is performed based on the determination result such that input data for a number of lines may be transferred from the first memory region and input data for a number of lines may be transferred from the second memory region.

10 Claims, 11 Drawing Sheets

| NUMBER OF IN-BAND PROCESSES | FIRST MEMORY REGION | | SECOND MEMORY REGION | |
|---|---|---|---|---|
| | NUMBER OF LINES | READ TOP ADDRESS POSITION | NUMBER OF LINES | READ TOP ADDRESS POSITION |
| 1 | 4 | FIRST LINE | 0 | NONE |
| 2 | 4 | FIRST LINE | 0 | NONE |
| 3 | 4 | FIRST LINE | 0 | NONE |
| 4 | 3 | SECOND LINE | 1 | FIRST LINE |
| 5 | 3 | SECOND LINE | 1 | FIRST LINE |
| 6 | 3 | SECOND LINE | 1 | FIRST LINE |
| 7 | 2 | THIRD LINE | 2 | FIRST LINE |
| 8 | 2 | THIRD LINE | 2 | FIRST LINE |
| 9 | 2 | THIRD LINE | 2 | FIRST LINE |
| 10 | 1 | FOURTH LINE | 3 | FIRST LINE |
| 11 | 1 | FOURTH LINE | 3 | FIRST LINE |
| 12 | 1 | FOURTH LINE | 3 | FIRST LINE |
| 13 | 0 | NONE | 4 | FIRST LINE |
| 14 | 0 | NONE | 4 | FIRST LINE |
| 15 | 0 | NONE | 4 | FIRST LINE |
| 16 | 0 | NONE | 4 | SECOND LINE |

| NUMBER OF IN-BAND PROCESSES | NUMBER OF REFERENCE LINES | NUMBER OF COMPLEMENTED LINES | FIRST MEMORY REGION | | SECOND MEMORY REGION | |
|---|---|---|---|---|---|---|
| | | | NUMBER OF LINES | READ TOP ADDRESS POSITION | NUMBER OF LINES | READ TOP ADDRESS POSITION |
| 1 | 2 | 2 | 2 | FIRST LINE | 0 | NONE |
| 2 | 2 | 2 | 2 | FIRST LINE | 0 | NONE |
| 3 | 2 | 2 | 2 | FIRST LINE | 0 | NONE |
| 4 | 3 | 1 | 2 | FIRST LINE | 1 | FIRST LINE |
| 5 | 3 | 1 | 2 | FIRST LINE | 1 | FIRST LINE |
| 6 | 3 | 1 | 2 | FIRST LINE | 1 | FIRST LINE |
| 7 | 4 | 0 | 2 | FIRST LINE | 2 | FIRST LINE |
| 8 | 4 | 0 | 2 | FIRST LINE | 2 | FIRST LINE |
| 9 | 4 | 0 | 2 | FIRST LINE | 2 | FIRST LINE |
| 10 | 4 | 0 | 1 | SECOND LINE | 3 | FIRST LINE |
| 11 | 4 | 0 | 1 | SECOND LINE | 3 | FIRST LINE |
| 12 | 4 | 0 | 1 | SECOND LINE | 3 | FIRST LINE |
| 13 | 4 | 0 | 0 | NONE | 4 | FIRST LINE |
| 14 | 4 | 0 | 0 | NONE | 4 | FIRST LINE |
| 15 | 4 | 0 | 0 | NONE | 4 | FIRST LINE |
| 16 | 4 | 0 | 0 | NONE | 4 | SECOND LINE |

US 9,036,197 B2

DATA TRANSFER CONTROL APPARATUS AND DATA TRANSFER CONTROL METHOD

BACKGROUND

1. Field

The present application relates to apparatuses and methods for transferring data, and, more specifically, it relates to a data transfer control apparatus and a data transfer control method for performing processing including processing a line of target with reference to surrounding lines.

2. Description of Related Art

Image forming apparatuses, such as a printer, may receive multivalued image data from a host PC, perform data processing including image processing on the image data with reference to surrounding pixels, and then form an image on a predetermined medium (such as paper, photographic paper, and a postcard). Image processing to be performed with reference to surrounding pixels may correspond to image processing which determines details of processing based on contents of other reference pixels disposed above and below and to the right and left of a pixel of target. Such image processing may include, for example, an enlargement process for enlarging multivalued image data and USM (unsharp mask) processing for performing a sharpening process on multivalued image data. Some image forming apparatuses may divide and store a series of image data. For example, some image forming apparatuses may divide received image data every plurality of lines and store them in a plurality of buffers or may store received image data in a memory region where the data is stored up to a lower limit of the memory region and then to a top part of the memory region like a ring buffer. When data are divided and stored, image processing may be performed by using a memory region excluding a memory region where received image data is being stored. Thus, data reception and image processing may be performed in parallel.

In this case, when reference image data are stored at divided storage locations, it may be required to read image data from the plurality of storage locations where they are stored as if a series of image data are stored and supply them to an image processing unit.

Accordingly, Japanese Laid-Open Patent No. 8-166921 discloses a method including setting two memory addresses, starting data transfer from a first address, and, if it is determined that the data transfer has finished, restarting data transfer from a second address. According to this method, image data divided into a plurality of memory regions may be transferred as a series of image data.

However, the data transfer method disclosed in Japanese Laid-Open Patent No. 8-166921 may change the transfer destination address only once in the middle of the processing and may not handle a case where image data divided and stored as described above are required to be transferred several times as a series of image data. Therefore, for example, in a case where image data are divided every plurality of lines to generate a plurality of bands and band processing is performed on each of the bands, the memory region to be read is changed several times within one band, which may require resetting a parameter for data transfer every time the memory region is changed.

Accordingly, a method may be considered which provides an overlap area at a boundary of a memory region, and image data is arranged in the overlap area for continuous transfer of image data. However, such an overlap area may disadvantageously require an extra memory. A load may be imposed on a CPU by copy processing for copying target image data from one memory region to an overlap area in another memory region, and memory access for the copy processing.

SUMMARY

According to one aspect of the subject matter discussed herein, an apparatus and a method are provided to address the situations described above. According to another aspect, an apparatus and a method are provided which may suppress an increase of memory usage and allow transfer of data divided into a plurality of memory regions as a series of data.

In one aspect, the claimed subject matter includes an apparatus which controls transfer to a processing unit of input data containing a plurality of lines stored across a plurality of memory regions including a first memory region and a second memory region, the apparatus including a specifying unit configured to specify a position of a line of target of output data containing a plurality of lines output from the processing unit, a determining unit configured to determine a number of lines of input data to be transferred from the first memory region and their addresses and determine a number of lines of input data to be transferred from the second memory region and their addresses based on the position of the line of target specified by the specifying unit, and a control unit configured to control based on a determination result from the determining unit such that input data for a number of lines may be transferred from the first memory region and input data for a number of lines may be transferred from the second memory region.

Further features will become apparent from the following description of example embodiments with reference to the attached drawings.

DETAILED DESCRIPTION

Embodiments of the present subject matter will be described below in detail with reference to drawings. It should be noted that the following embodiments are not intended to limit the claimed subject matter.

First Embodiment

A first embodiment will be described by applying an inkjet printing apparatus (hereinafter, called a printing apparatus) as an example of a data transfer control apparatus.

Figure 1:
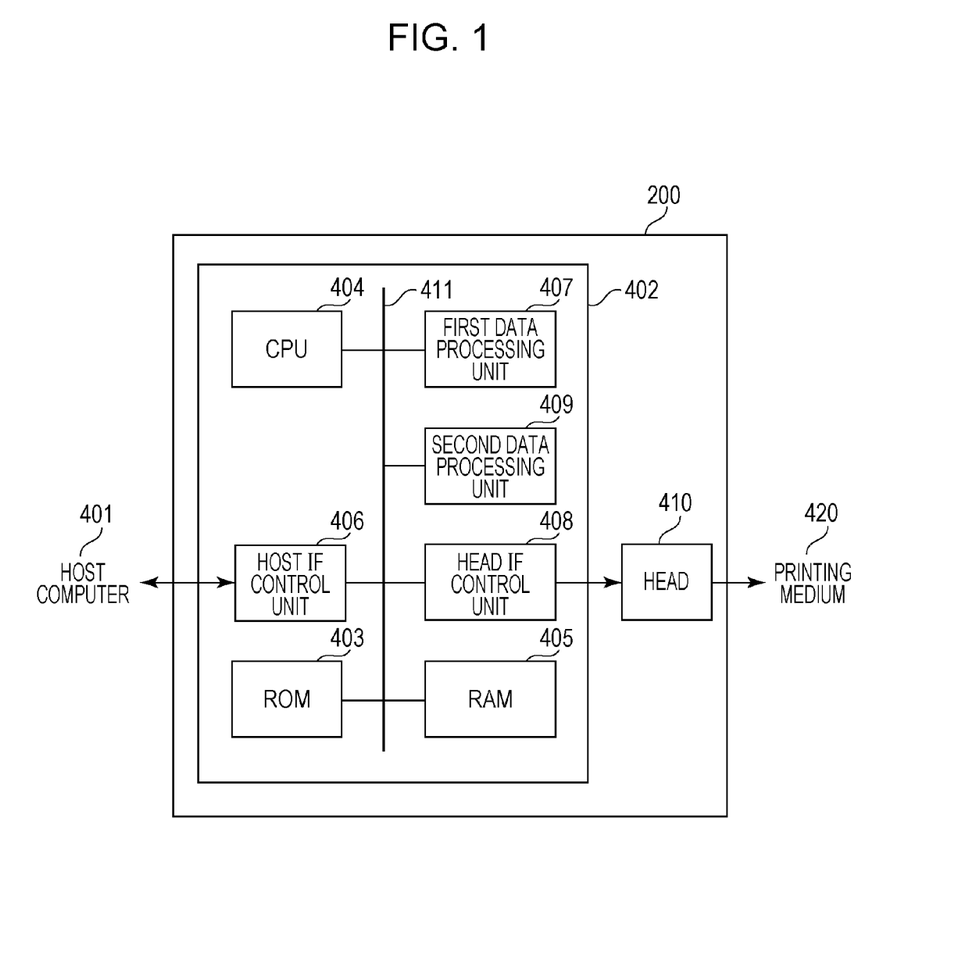
FIG. 1 is a schematic configuration diagram of a controller in a printing apparatus according to a first embodiment.

FIG. 1 is a block diagram illustrating an example of a configuration of a printing apparatus according to a first embodiment.

A printing apparatus 200 according to this embodiment includes a controller 402 and a head 410 and is connectable to an external host computer 401.

The controller 402 is a control device configured to control the printing apparatus 200. The controller 402 includes a ROM 403, a CPU 404, a RAM 405, a host IF control unit 406, a first data processing unit 407, a head IF control unit 408, and a second data processing unit 409. They are connected with each other via a common bus 411. The connected components are capable of communicating with each other via the common bus 411.

The ROM 403 is a readable memory which stores a program for controlling the printing apparatus 200. The CPU 404 executes a program stored in the ROM 403 for control over the printing apparatus 200.

The RAM 405 is a readable/writable memory which is usable as a program execution region or a storage region for data such as image data. The RAM 405 according to this embodiment has a plurality of buffers and has a memory region divided by the buffers. Image data is divided every plurality of lines, which are then stored in the buffers. For this, a series of image data is divided with respect to a memory address in the RAM 405 at a buffer boundary. The RAM 405 may include, for example, a buffer for host data reception, a buffer to be referred for an enlargement process, a buffer for storage after an enlargement process, and a buffer for a gradation level reduction process, and details of processing are independent between the buffers. The RAM 405 having the configuration as described above may allow exclusive memory access and allow efficient execution of processing as a whole. Hereinafter, a top address and a last address of a buffer will be called "memory address boundary", and changeover of a reference address from a last address of a buffer to a top address of another buffer will be referred by the expression "crossing (or across) a memory address boundary". A plurality of buffers within the RAM 405 will be called a first memory region and a second memory region, which are not different RAMs 405 however.

The host IF control unit 406 communicates with the host computer 401 to receive data of a print job, for example, and stores the received data to the RAM 405. According to this embodiment, image data contained in a print job received by the host IF control unit 406 is multi-gradation image data (hereinafter, called image data) in which 1 pixel is represented by 3 colors of R, G, and B and the gradation in one color is 8 bits.

The first data processing unit 407 performs processing for scaling image data stored in the RAM 405 based on a printing condition contained in a print job. According to this embodiment, an enlargement process is performed on image data as an example of such a scaling process. Image data enlarged by the first data processing unit 407 is stored in the RAM 405.

The second data processing unit 409 performs a process for generating ink color image data from the enlarged image data stored in the RAM 405 in accordance with a printing condition contained in the print job. According to this embodiment, multivalued R, G, and B data are converted to multivalued C (cyan), M (magenta), Y (yellow), and K (black) ink colors to generate ink color image data. Processing is performed for reducing gradation levels for generating printable binary image data to be used for printing performed by the printing apparatus 200 from ink color image data, and the generated binary image data are stored in the RAM 405.

The head IF control unit 408 outputs the binary image data stored in the RAM 405 to the head 410.

The head 410 applies ink to a printing medium 420 based on the binary image data to print an image.

The host computer 401 is an information processing apparatus configured to create a print job containing image data information and printing condition information necessary for printing.

The serial printing apparatus 200 according to this embodiment has a print head mounted on a carriage that moves at a constant speed in a main scanning direction. Ink droplets are ejected at a frequency corresponding to the constant speed for printing on a printing medium such as printing paper. Every time when one printing main scanning finishes, the printing medium is conveyed by a predetermined amount in a sub-scanning direction perpendicular to the main scanning direction. By intermittently repeating such printing main scanning and conveying operations, an image is printed on a printing medium in step-wise manner. Note that the print head includes a plurality of printing elements configured to eject ink. The controller 402 controls operations as described above.

An internal configuration of the first data processing unit 407 will be described in detail below.

According to this embodiment, the first data processing unit 407 executes an enlargement process by applying bicubic interpolation. An enlargement process by a bicubic algorithm will be described briefly. A bicubic algorithm is an algorithm which determines a pixel value of a pixel of target which is a pixel to be output, for example, with reference to surrounding 16 (4×4 matrix) pixels about a position of the pixel of target. The positions of reference pixels in 4×4 matrix may be moved with respect to the pixel of target so that the original image data may be enlarged. In other words, the bicubic algorithm refers 4 lines of pixels to output 1 line of pixels.

Figure 3:
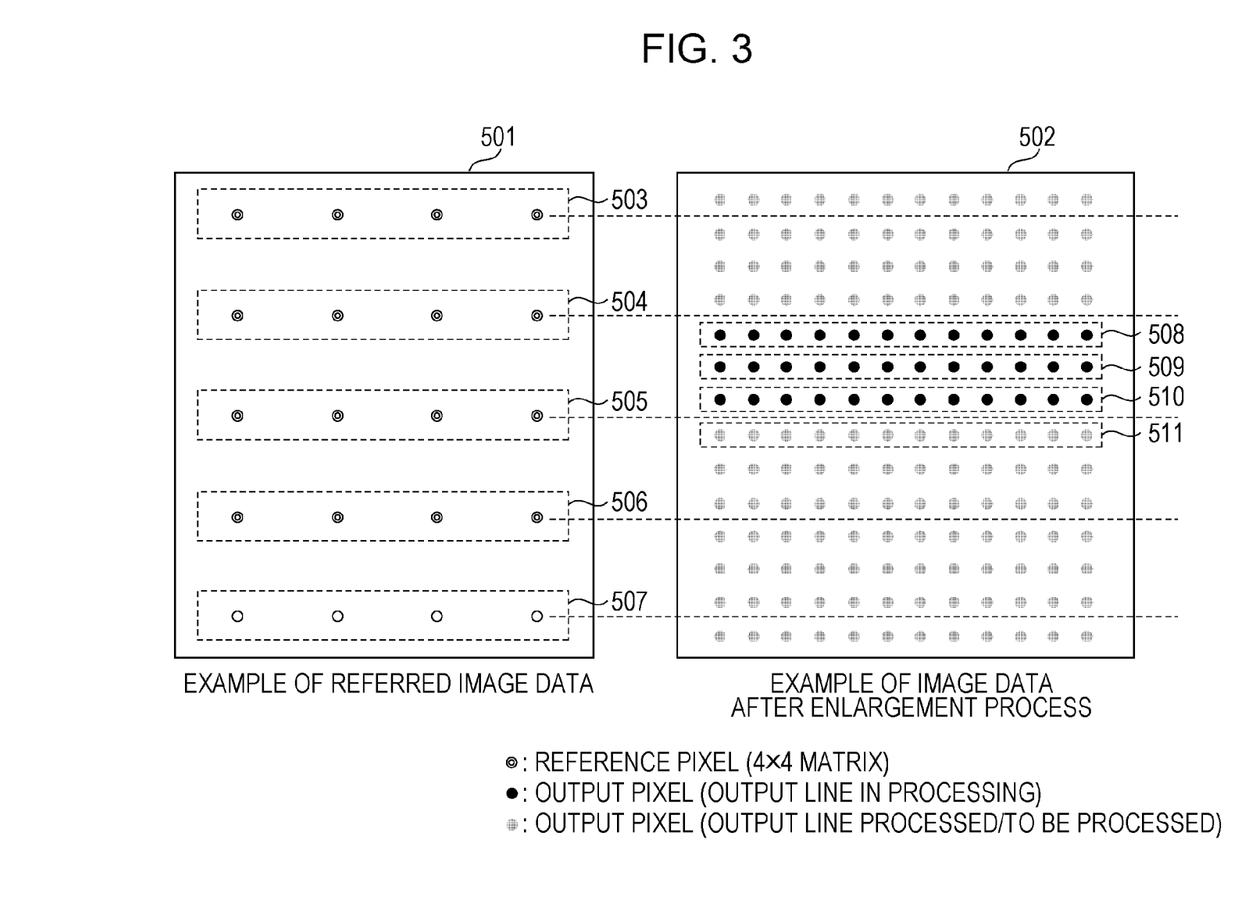
FIG. 3 illustrates a reference image and an image of target when an enlargement process is performed according to the first embodiment.

FIG. 3 illustrates an example of the enlargement process. According to this embodiment, a case where an enlargement process is performed with an enlargement rate of ×3 will be described. An image data example 501 illustrated in FIG. 3 illustrates positions of reference pixels of 4×4 matrix which are referred by the pixel of target. An image data example 502 is an enlargement process result (output result) after an enlargement process with reference to the reference pixels.

The enlargement process first determines a pixel position of a pixel of target and determines positions of reference pixels corresponding thereto. The term "pixel position of a pixel of target" refers to a position of a pixel to be output. According to this embodiment, pixels of target are handled in units of lines, and pixels of target in units of lines will be called "line of target" or "subject line". First of all, a line position 508 in the image data example 502 is defined as the position of a line of target. Because the position (line position 508) of the line of target is between the line positions 504 and 505 in the image data example 501, line positions 503, 504, 505, and 506 of pixel data are to be referred. In other words, the four lines (503, 504, 505, 506) are referred to generate one line (line position 508) of output pixels. According to this embodiment, because the enlargement rate is ×3, pixels at the line position 509 in the image data example 502 are between the line positions 504 and 505 in the image data example 502 in a case where the pixels at the line position 509 are pixels of target and in a case where pixels at the line position 510 are pixels of target. Therefore, the line position of the image data to be referred is the same as that of the line position 508. Next, when the line position 511 is defined as a line of target, it is between the lines 505 and 506 in the image data example 501. Thus, image data at the line positions 504, 505, 506, and 507 are to be referred. Therefore, a line position to be referred is changed depending on a line position of pixels of target to be processed. According to this embodiment, because processing is performed in units of band, the reference line position is updated within a band. When the RAM 405 has a plurality of buffers as described above, the reference buffer is changed in the middle of band processing. Thus, the reference line position may be across a memory address boundary for some positions of the line of target.

Figure 2:
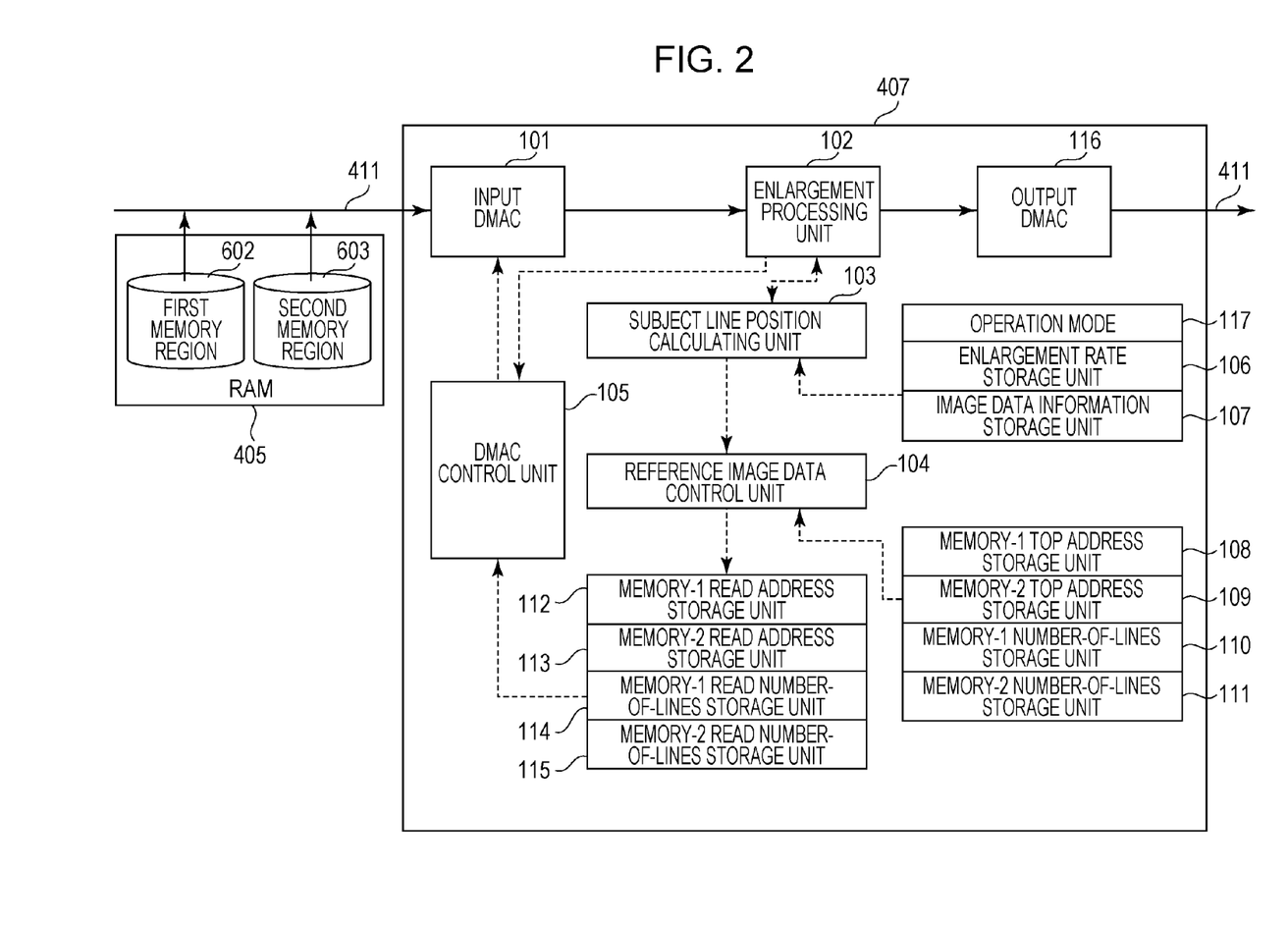
FIG. 2 is an internal configuration diagram of a data processing unit according to the first embodiment.

FIG. 2 is a block diagram illustrating an internal configuration of the first data processing unit 407. According to this embodiment, two buffers, corresponding to the plurality of buffers, are provided to store multivalued image data to be referred by an enlargement process, and the two buffers include a first memory region 602 and a second memory region 603 within the RAM 405.

An input Direct Memory Access Controller (DMAC) 101 is a DMAC configured to read out image data (input data) to be referred from the RAM 405 in response to an instruction from a DMAC control unit 105 and supplies them to an enlargement processing unit 102. The enlargement processing unit 102 performs processing for enlarging image data to be referred to a magnification designated by the bicubic algorithm and transmits the generated enlarged image data to an output DMAC 116. The output DMAC 116 writes the enlarged image data (output data) to the RAM 405 via the common bus 411.

An enlargement rate storage unit 106 stores a magnification value (enlargement rate) for an enlargement process. An image data information storage unit 107 stores an initial line position of the position of the line of target to be processed in a subject band, which will be described below. A mode based on an enlargement algorithm used for an enlargement process is set in an operation mode 117. According to this embodiment, a bicubic operation mode is set. A corresponding parameter is set before a band process is started.

A memory-1 top address storage unit 108 (hereinafter, called storage unit 108) stores a memory address value of a top pixel to be referred by a line of target within a band in the first memory region 602. A memory-1 number-of-lines storage unit 110 (hereinafter, called a storage unit 110) stores the number of lines to be referred by a line of target within a band in the first memory region 602. A memory-2 top address storage unit 109 (hereinafter, called a storage unit 109) stores a memory address value of a top pixel to be referred by a line of target within a band in the second memory region. A memory-2 number-of-lines storage unit 111 (hereinafter, called a storage unit 111) stores the number of lines to be referred by the line of target within a band in the second memory region. The enlargement rate storage unit 106, image data information storage unit 107, storage unit 108, storage unit 109, storage unit 110, and storage unit 111 are set by the CPU 404 before a band process is started.

In response to a notification of start of a band process from the CPU 404, a subject line position calculating unit 103 obtains an enlargement rate from the enlargement rate storage unit 106 and determines a position of a pixel of target (hereinafter, also called a line-of-target position) subject to an enlargement process. In other words, when a band process starts, a line position to be processed is calculated from a given enlargement rate and a coordinate position of a pixel of target from which the process starts.

A reference image data control unit 104 generates information describing which line position is to be referred in image data based on the calculated line-of-target position and information in the storage units 108, 109, 110, and 111. The reference image data control unit 104 determines the read address and the number of lines of image data to be referred based on the position of the line of target. More specifically, the reference image data control unit 104 stores a top address value read from the first memory region 602 in a memory-1 read address storage unit 112 (hereinafter, called a storage unit 112) and stores the number of lines read out from the first memory region 602 in a memory-1 read number-of-lines storage unit 114 (hereinafter, called a storage unit 114). Similarly, the reference image data control unit 104 stores a top address value read out from the second memory region 603 in a memory-2 read address storage unit 113 (hereinafter, called a storage unit 113) and stores the number of lines read out from the second memory region 603 in a memory-2 read number-of-lines storage unit 115 (hereinafter, called a storage unit 115). The reference image data control unit 104 updates values in the storage units 112 to 115 every time the line-of-target position is changed.

The DMAC control unit 105 instructs how many lines are to be read out from which position in the first memory region 602 to the input DMAC based on information in the storage units 112, 113, 114, and 115 and also instructs how many lines are to be read out from which position in the second memory region 603. The DMAC control unit 105 obtains information in the storage unit 112 to 115 every time the position of the line of target (subject line position) changes and, based on the information, sets the position from where the reading starts and the amount to be read in the DMAC 101 and instructs the DMAC 101 to start reading.

Figure 4:
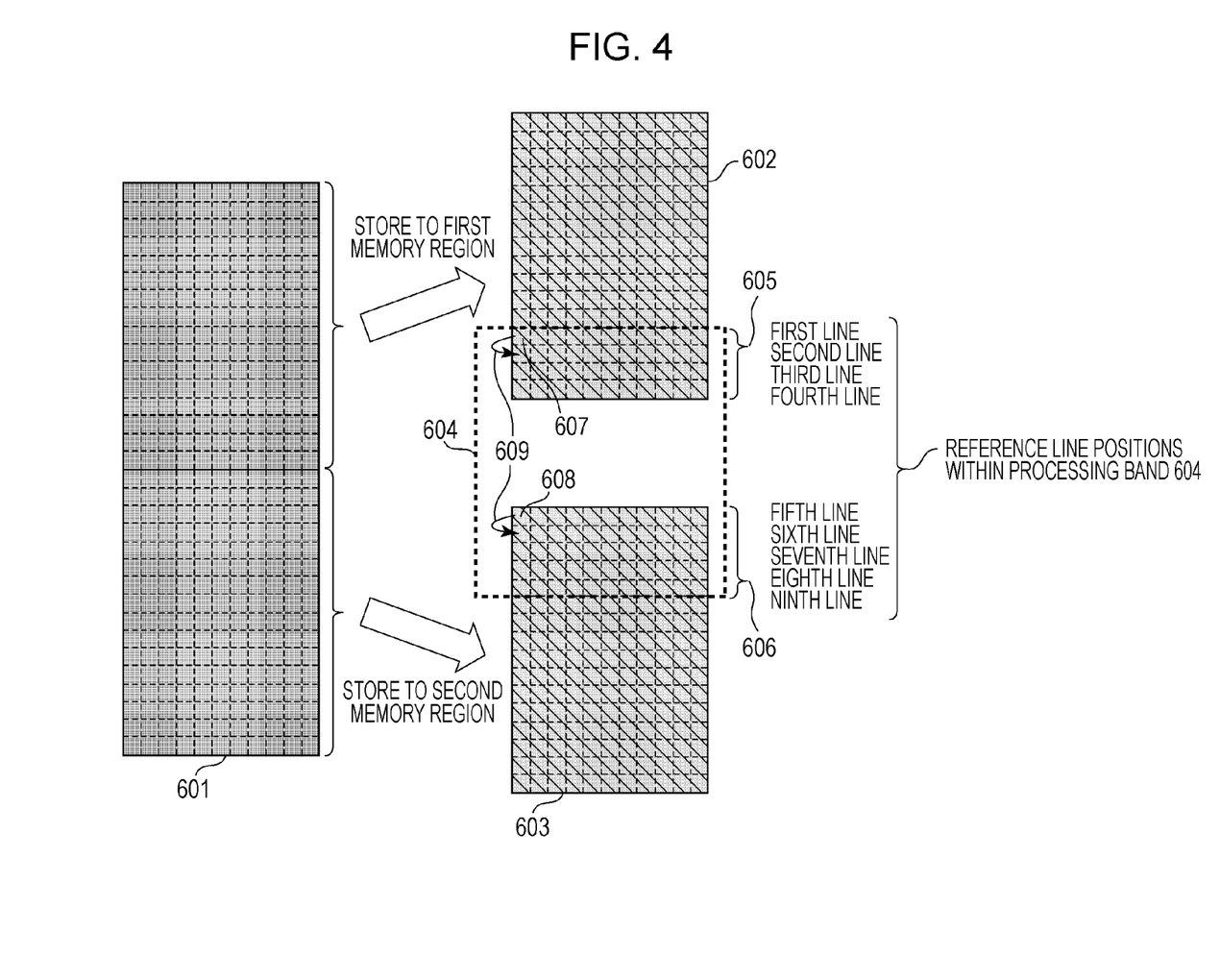
FIG. 4 illustrates an enlargement process in units of band at a buffer boundary according to the first embodiment.

FIG. 4 is an explanatory diagram of an enlargement process in units of bands according to this embodiment. According to this embodiment, image data 601 for 64 lines which are parts of multivalued image data are divided into data sets each for 32 lines, and the data sets are arranged in the first memory region 602 and the second memory region 603 in the RAM 405. According to this embodiment, an enlargement rate to be used by an enlargement process is ×3 (300%), and the number of band lines to be output by one band is equal to 16 lines. When such an enlargement process is performed in a plurality of units of bands by fixing the number of band lines to be output by 1 to 16 lines, the top line position of image data to be referred in the next band is 16 lines÷3 times=5.3 lines. In other words, the top line position of image data to be referred in the next band is incremented by five or six lines from the top line position of image data referred in the current band. Thus, when an enlargement rate is ×3, which line within a band will cross a buffer boundary (memory address boundary) is not fixed. In other words, when an enlargement rate is ×3, buffers possibly may be crossed or not be crossed by a line, and the position of the line crossing the boundary changes every time. In order to address this, it may be required to calculate a subject position for an enlargement process and calculate the line position of image data to be referred every time, as in this embodiment. The same is true if the magnification is odd when the number of band lines to be output by one band is fixed to 16 lines. Furthermore, even when it is not fixed to 16 lines but when the value of (output the number of band lines)÷(enlargement rate) is an integer, which line within a band will cross a buffer boundary is not fixed.

An enlargement process at a line position in a buffer boundary will be described with reference to the subject band 604 among a plurality of bands, for example. The number of lines of image data to be referred by the subject band 604 may be acquired from (the number of output lines ÷ magnification)+

(the number of reference lines of each line in the band)−1. Therefore, according to this embodiment, 16 (lines)÷3 (times)+4−1=8.3 is acquired, and the number of lines to be referred within the subject band 604 is rounded up to 9 lines. Out of the 9 lines, the upper 4 lines (605) are included in the first memory region 602, and the lower 5 lines (606) are included in the second memory region 603. In other words, the fourth and fifth lines within the subject band 604 are not continuous in memory address. FIG. 4 illustrates an address 607 of a top pixel in a top line of lines to be referred by the subject band 604 within the first memory region, which will be called "top pixel address in the first memory region of the subject band 604", hereinafter. FIG. 4 further illustrates an address 608 of a top pixel in a top line of lines to be referred by the subject band 604 in the second memory region, which will be called "top pixel address in the second memory region of the subject band 604", hereinafter.

FIG. 4 further illustrates an address value 609 indicative of a difference between addresses of left end pixels of lines, which will be called a "line offset", hereinafter. Because a magnification rate of ×3 is designated at the initial line position of the line-of-target position in the subject band 604, line positions 508, 509, and 510 in FIG. 3 may be available for selection. Any one of them may be selected. The line position 508 is set as the initial line position in this embodiment.

Figure 5A:
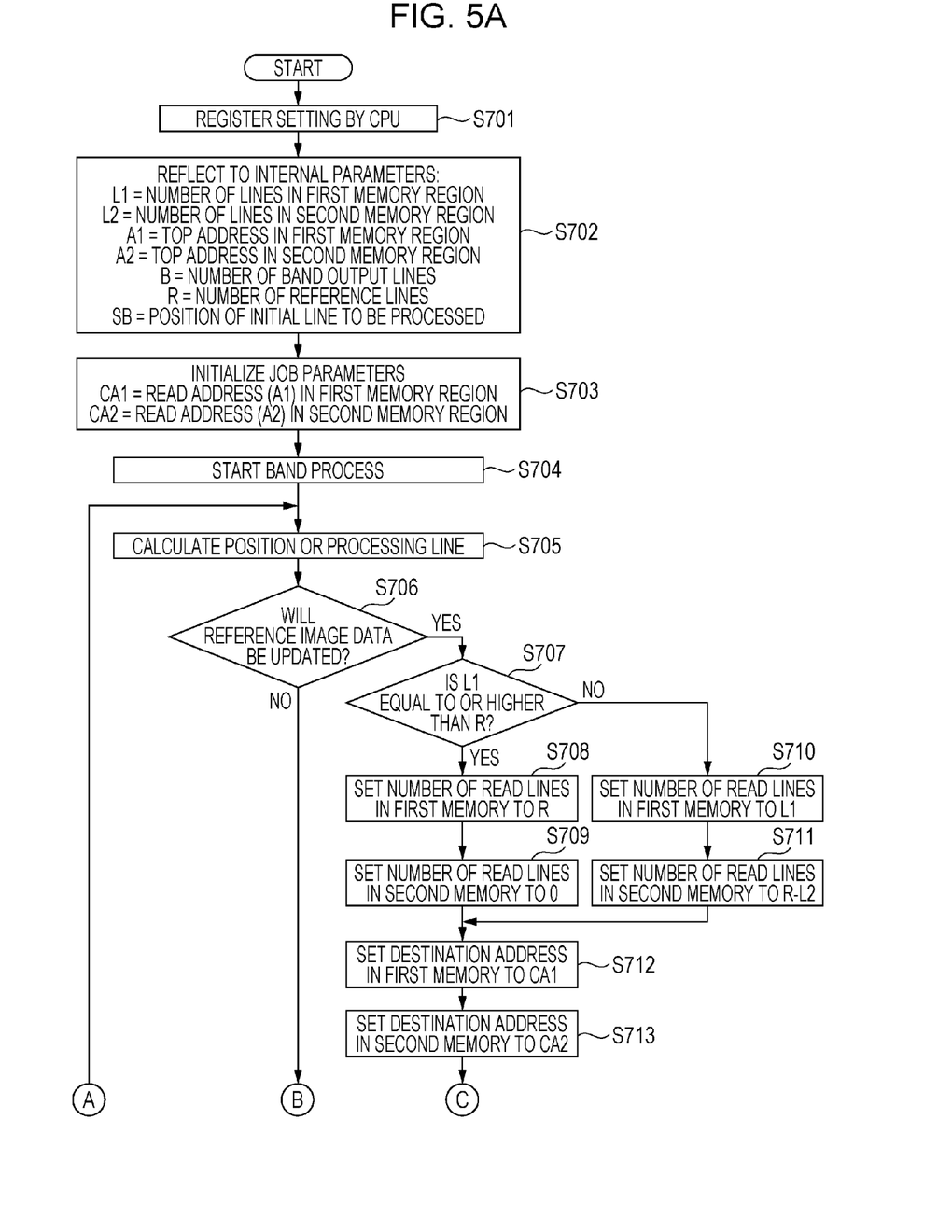
FIGS. 5A and 5B are flowcharts illustrating control over a data processing unit according to the first embodiment.
Figure 5B:
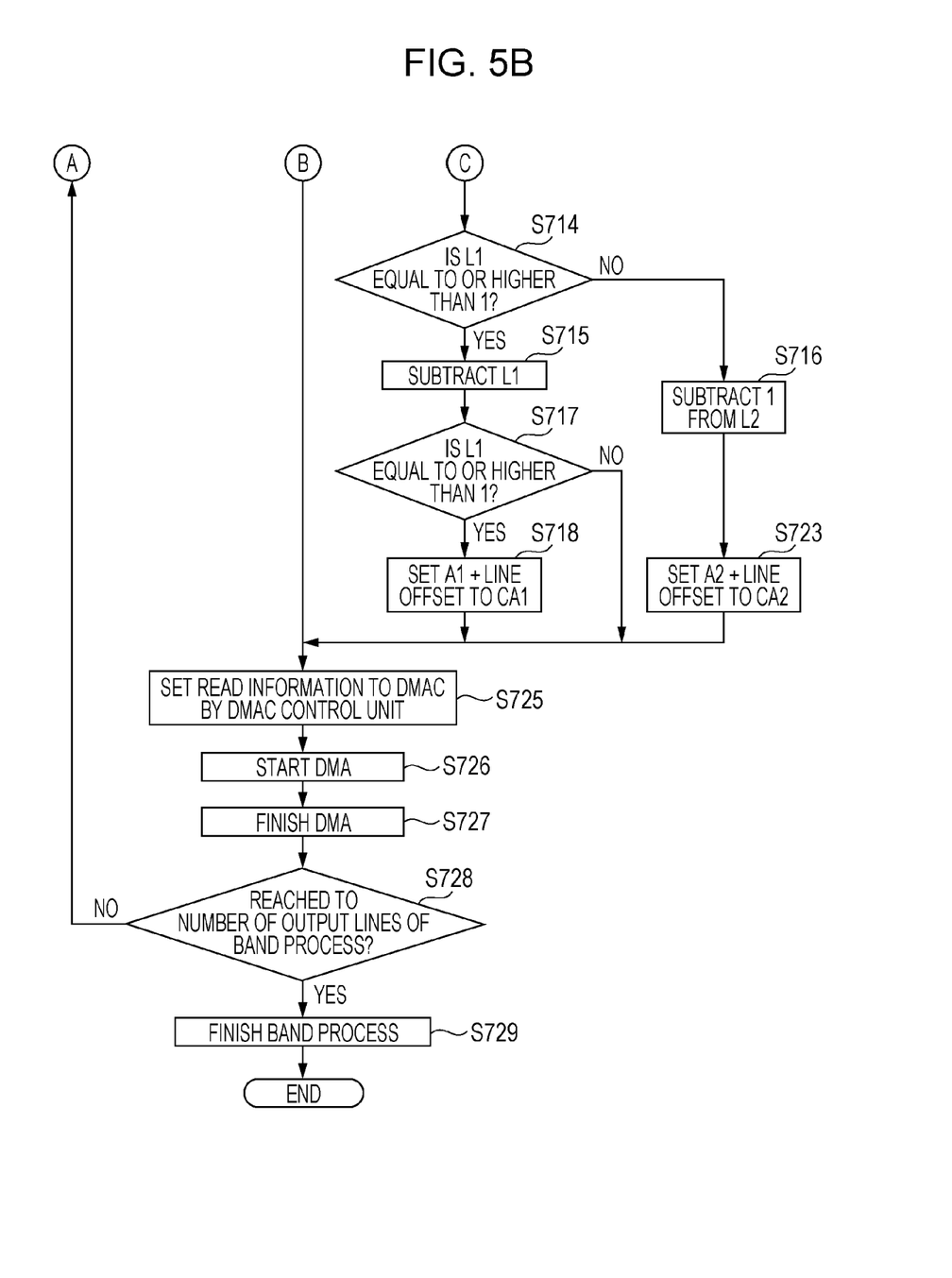

FIGS. 5A and 5B are flowcharts illustrating control over line management for supplying data from the first data processing unit 407 to the enlargement processing unit 102. Exemplary data flows will be described in which the subject band 604 in FIG. 4 undergoes an enlargement process. According to this embodiment, because the subject band 604 has an enlargement rate of ×3 and outputs 16 lines, the enlargement process is executed 16 times.

First, in step S701, the CPU 404 sets registers (106, 107, 108, 109, 110, 111, 116, and 117) within the data processing unit 407.

Next, in step S702, the register set values are reflected to the internal parameters L1, L2, A1, A2, B, R, and SB. More specifically, the number of lines in the storage unit 110 is set to L1, and the address value in the storage unit 108 is set to A1. The number of lines in the storage unit 111 is set to L2, and the address value in the storage unit 109 is set to A2. The number of lines in the output DMAC 116 is set to B as the number of band output lines. The number of reference lines is set to R. According to this embodiment, because the operation mode is a bicubic algorithm, value 4 is set to R as the number of reference lines. The first line that is the initial line position in the image data information storage unit 107 is designated to SB.

In step S703, job parameters are initialized. CA1 is a parameter indicative of a top pixel address to be read out from the first memory region when DMAC starts, and the set value of A1 is set as the initial value of CA1. CA2 is a parameter indicative of a top pixel address to be read out from the second memory region when DMAC starts, and the set value of A2 is set as the initial value of CA2.

In step S704, the CPU 404 instructs to start band processing.

In step S705, the subject line position calculating unit 103 is caused to calculate the position of a line subject to an enlargement process. In the first processing in the subject band 604, the first, second, third and fourth lines within the subject band 604 in FIG. 4 are reference lines, and SB is at the first line. Therefore, the line-of-target position is between the second and third lines within the subject band 604. When the first to fourth lines within the band 604 correspond to 503 to 506 in FIG. 3, the position of the line of target is the line position 508 in FIG. 3.

Next, in step S706, the reference image data control unit 104 determines whether the line position of the reference image data is to be updated or not. If so, the flow proceeds to S707. If not, the flow proceeds to S725. Here, because this is the first process in the band processing and may require updating, the flow proceeds to step S707.

In step S707, the reference image data control unit 104 determines whether the number of lines at L1 is equal to or higher than the number of lines at R. If it is equal to or higher than the number of lines at R, the flow proceeds to step S708. If not, the flow proceeds to step S710. Here, because this is the first process in the band processing and L1 has value 4 which is equal to the number of lines (4 lines) at R, the flow moves to step S708.

In step S708, the reference image data control unit 104 sets R to the storage unit 114. Here, value 4 (4 lines) is set to R. In step S709, the reference image data control unit 104 sets value 0 (0 lines) to the storage unit 115. Next, in step S712, the reference image data control unit 104 sets CA1 to the storage unit 112. Next, the reference image data control unit 104 sets CA2 to the storage unit 113. At the end of steps S708 to S713, the generation of parameters to be set to the DMAC is finished.

Next, processing is performed for preparing parameters for updating the next reference image data. First, in step S714, the reference image data control unit 104 determines whether L1 has a value equal to or higher than 1. If so, the flow proceeds to S715. If L1 is equal to 0, the flow proceeds to S716. Because L1 has value 4 (4 lines) at the first process, the flow proceeds to step S715. In step S715, the reference image data control unit 104 subtracts 1 from L1 so that L1 has value 3 (3 lines), and the flow proceeds to step S717. In step S717, the reference image data control unit 104 determines again whether L1 has a value equal to or higher than 1. If so, the flow proceeds to S718. If L1 has value 0, the flow proceeds to S725. In this case, because L1 has value 3 (3 lines), the flow proceeds to step S718. In step S718, the reference image data control unit 104 sets to CA1 an address value acquired by adding the line offset to A1. CA2 is not updated because reference data may not be read out from the second memory region, and the flow moves to step S725. S714 to S718 are processing steps for preparing parameters for the next update.

Next, in step S725, the DMAC control unit 105 fetches set values in the storage units 112, 113, 114 and 115. After the set values are fetched by the DMAC control unit 105, the set values are set to the input DMAC 101.

In step S726, after completing the setting to the input DMAC 101, the DMAC control unit 105 notifies the input DMAC of start of DMA transfer. The input DMAC 101 starts DMA transfer in response to the set instruction. More specifically, the DMAC 101 first reads out, through a 32-Byte burst transfer, data for 32 pixels in the first line of the reference lines from the corresponding memory-1 read address in the first memory region 602. Next, the DMAC 1 reads out, through 32 byte burst transfer, data for 32 pixels in the second line of the reference lines from the address acquired by adding the line offset 609 to the memory-1 read address. Similarly, the line offset 609 is used to read out the third line and fourth line from the memory-1. While, according to this embodiment, the reading from memory is performed through burst transfer, an embodiment is not limited thereto. When data are read out up to the fourth line, data for 32 pixels at left ends of four lines of the reference lines are allowed to be supplied to the enlargement processing unit 102 so that an enlargement process may be started. Enlarged image data are transmitted to the output DMAC 116, and the output DMAC 116 stores them to the RAM 405. According to this embodiment, after data for 96 pixels that are three times of 32 pixels are output, the input DMAC 101 again reads out data for 32 pixels of each of four lines from the continuation of the image data and supplies them to the enlargement processing unit 102 where the data are image-processed. This processing is repeated up to the right end of the image data.

In step S727, after the enlargement process is performed up to the right end of the image data, the DMAC control unit 105 receives a notification of the end of the image process from the enlargement processing unit 102. The flow then proceeds to step S728.

In step S728, the subject line position calculating unit 103 determines whether the subject line position has reached to the number of output lines of the band process or not. If so, the flow proceeds to S729. If not, the flow proceeds to S705. The number of output lines is 16, and the first line is being processed. Thus, the flow returns to step S705.

The operations above correspond to the control flow over the first processing on the subject band 604.

Next, the control flow over the second processing on the subject band 604 will be described briefly. In step S705, the subject line position calculating unit 103 increments the subject line position by one line, and the subject line position is now the line position 509 in FIG. 3. In this case, the line-of-target position 509 is between the second and third lines within the subject band in FIG. 4, and the upper and lower two lines are still the line positions to be referred. Thus, in step S706, it is judged that the change of the line position of the reference image data is not necessary. Then, the flow proceeds to step S725. In steps S725, S726, and S727, the same settings as those of the first processing are defined in the DMAC 101, and DMA transfer is started, and the DMA transfer is finished. Because it is the second processing in step S728, the flow returns to step S705. The operations up to this point correspond to the control flow over the second processing on the subject band 604.

When the enlargement rate is ×3, the line position of the reference image data may be updated once every three times. Thus, it is determined in step S725 that the line position of reference image data is not to be updated for not only the second processing, but the third, fifth, sixth, eighth, ninth, eleventh, twelfth, fourteenth and fifteenth processing. Because the same flow as the flow of the second processing is performed for them, the description will be omitted.

Next, a control flow for the fourth processing on the subject band 604 will be described. In step S705, the subject line position calculating unit 103 increments the subject line position by 1 (line), and the subject line position is now the line position 511 in FIG. 3. In other words, the subject line position is now between the third and fourth lines within the subject band in FIG. 4, and the line positions to be referred are at the second, third, fourth and fifth lines in FIG. 4. Thus, in step S705, it is judged to update the read information on the reference image data. The flow then proceeds to step S707. In step S707, because L1 has value 3 (lines), the flow proceeds to step S710. In step S710, the reference image data control unit 104 sets value 3 (lines) of L1 to the storage unit 114. In step S711, the reference image data control unit 104 sets value 1 (line) (acquired by calculating 4 line−3 line here) of R−L1 to the storage unit 115. In steps S712 and S713, the reference image data control unit 104 sets CA1 and CA2 to the storage unit 112 and storage unit 113, respectively. Next, the flow proceeds to S728 through steps S714 to S718. Because it is judged as the fourth processing in step S728, the flow returns to step S705 again. Because the seventh band processing is performed by following the same flow, the description will be omitted.

Next, the tenth, thirteenth and sixteenth processing on the subject band 604 will be described. For the tenth, thirteenth and sixteenth processing, the subject line position is not between the second and third lines of the reference data. Thus, it is determined in step S706 that the reference line position is update, the flow proceeds to step S707.

First, a control flow for the tenth processing on the subject band 604 will be described. In the tenth processing, the flow proceeds to step S707 and then to step S717 through S710. In step S717, L1 has value 0 (line), the flow proceeds to step S728 through step S725 without updating CA1 and CA2. In step S728, because this is the tenth processing, it is judged that the processing has not reached to the number of output lines of the band processing, and the flow returns to step S705 again. In other words, in the thirteenth band processing where the next update is to be performed, reference data is not read out from the memory-1.

In the thirteenth and sixteenth processing on the subject band 604, the flow proceeds to step S707 and then to step S714 through S710. Because L1 has value 0 (line) in step S714, the flow moves to step S716. Because L2 has value 5 (line) in step S716, the reference image data control unit 104 subtracts 1 from the number of lines in L2, and L2 has value 4 (lines). In step S723, the reference image data control unit 104 sets to CA2 an address value acquired by adding the line offset to A2. Then, the flow proceeds to step S728 through step S725. Because L1 has value 0, the CA1 is not to be used. Therefore, its setting is not updated. In step S728, in the tenth processing, it is judged that the processing has not reached to the number of output lines of the band process, the flow returns to step S705 again. On the other hand, in the sixteenth processing, the number of times of processing is 16, and it is thus judged that the processing has reached to the number of output lines. Thus, the flow proceeds to step S729. In step S729, the CPU 404 is notified that the band processing has finished, and the CPU 405 detects that the band processing has completed.

Figure 6:
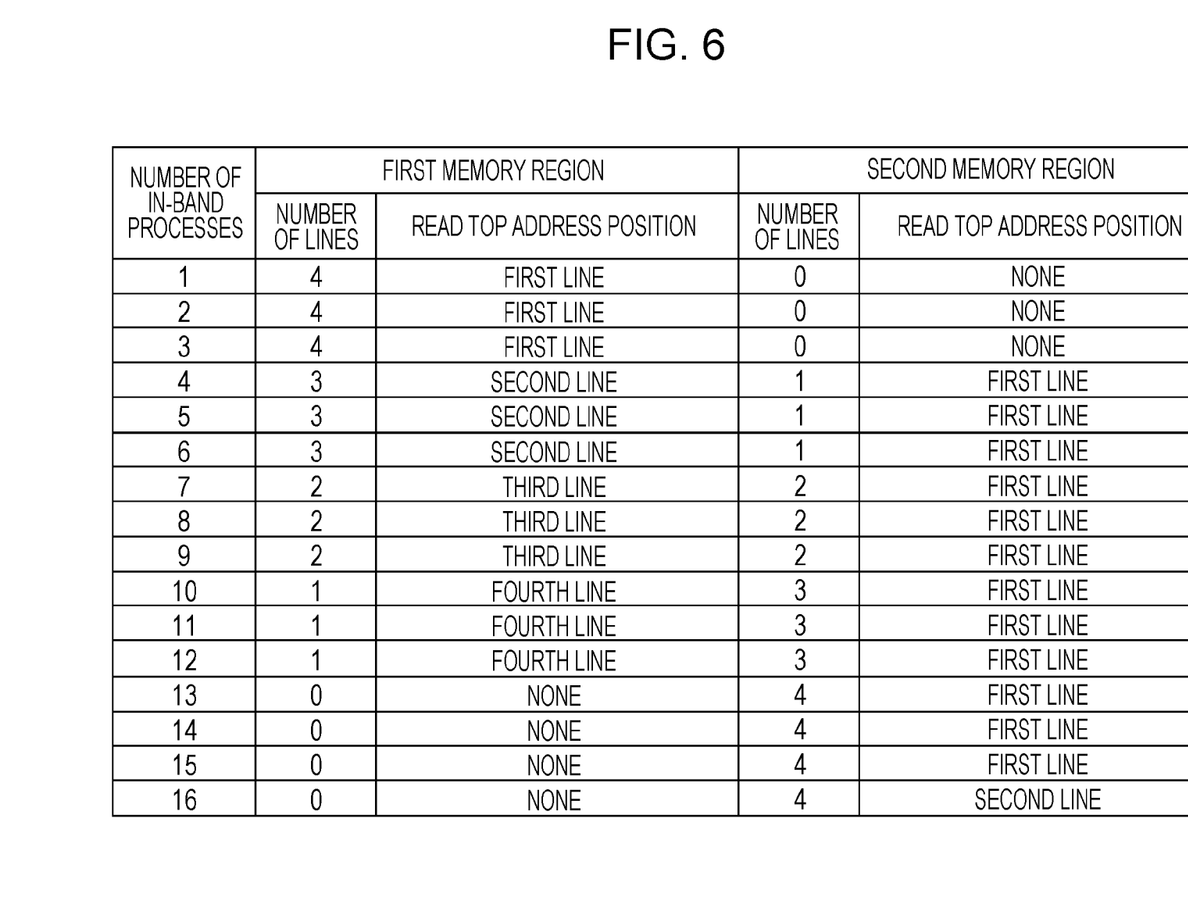
FIG. 6 illustrates the number of lines to be read from a memory and the position of a read top address for processing on image data according to the first embodiment.

FIG. 6 illustrates the number of lines to be read from a memory and the position of a read top address for processing on image data to be referred in the subject band 604 against the number of times of processing. Here, the number of lines of the first memory region corresponds to L1, and the number of lines of the second memory region corresponds to L2.

As illustrated in FIG. 6, because the enlargement rate is ×3, when the number of times of processing within the band is a multiple of 3 in a case where the number of times of processing within the band is in the range of 1 to 12, the position of the top address for reading out the first memory region changes. When the number of times of processing is equal to 13 or higher, the reference lines are all included in the second memory region. According to this embodiment, the position of the line of target to be output is calculated, and the line position to be referred is determined for each memory region to be referred based on the position of the line of target. Thus, data may be supplied to the enlargement processing unit even when reference image data is divided into two memory regions within one band. Therefore, even image processing in which image data in two memory regions are referred may use the DMAC to allow band processing without involving the CPU in the middle of the processing. The band processing may further be performed without an increase of memory usage by data copy on memory. In other words, when image data are divided by a plurality of lines to generate a plurality of bands and image processing is executed band by band, the use of DMAC may allow performing the processing on a plurality of lines collectively without involving the CPU in the middle of the processing. Furthermore, unnecessary memory accesses may be prevented. Therefore, image processing with reference to surrounding pixels may be performed at higher speed.

Second Embodiment

Figure 7:
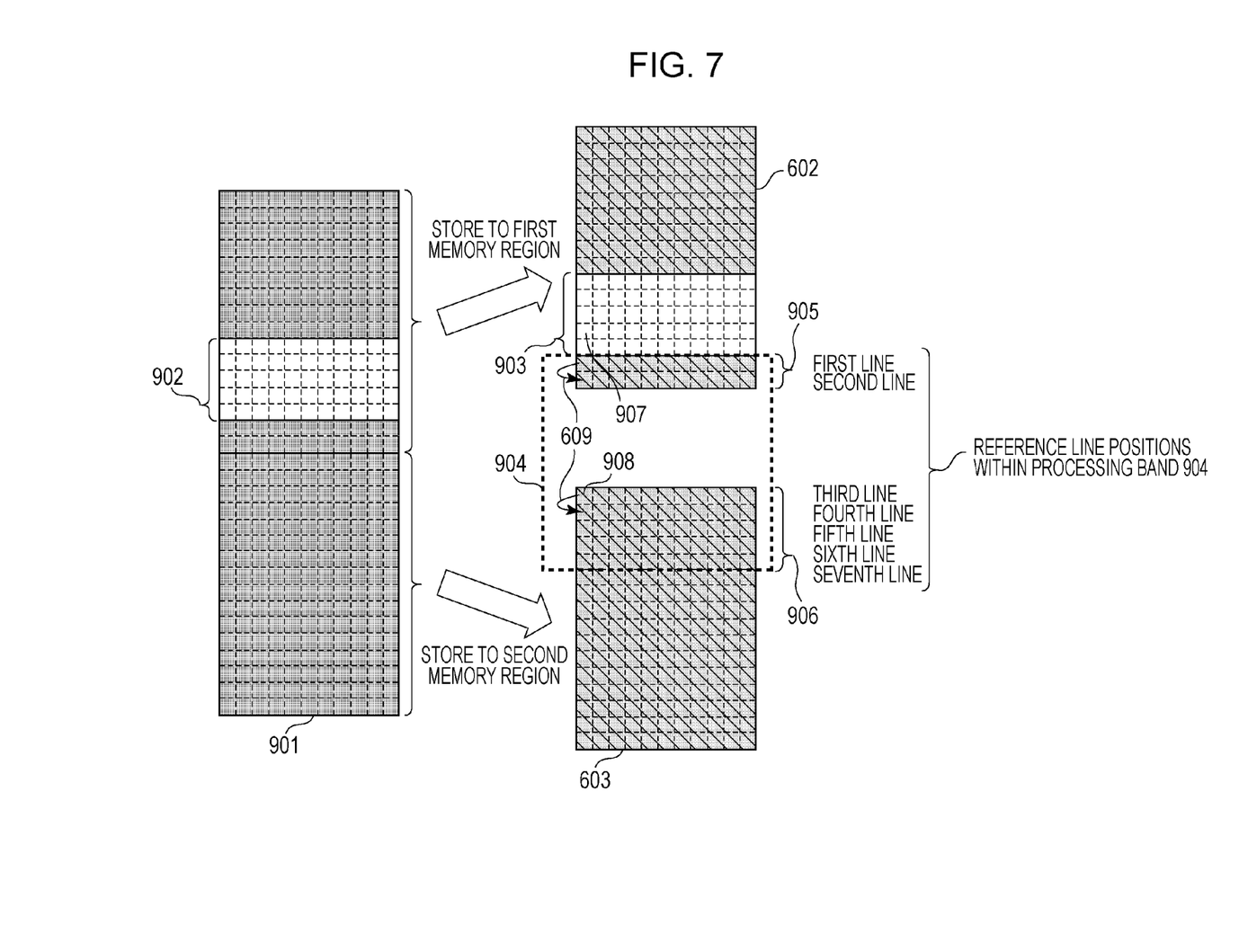
FIG. 7 illustrates an enlargement process in units of band at a buffer boundary according to a second embodiment.
Figure 8A:
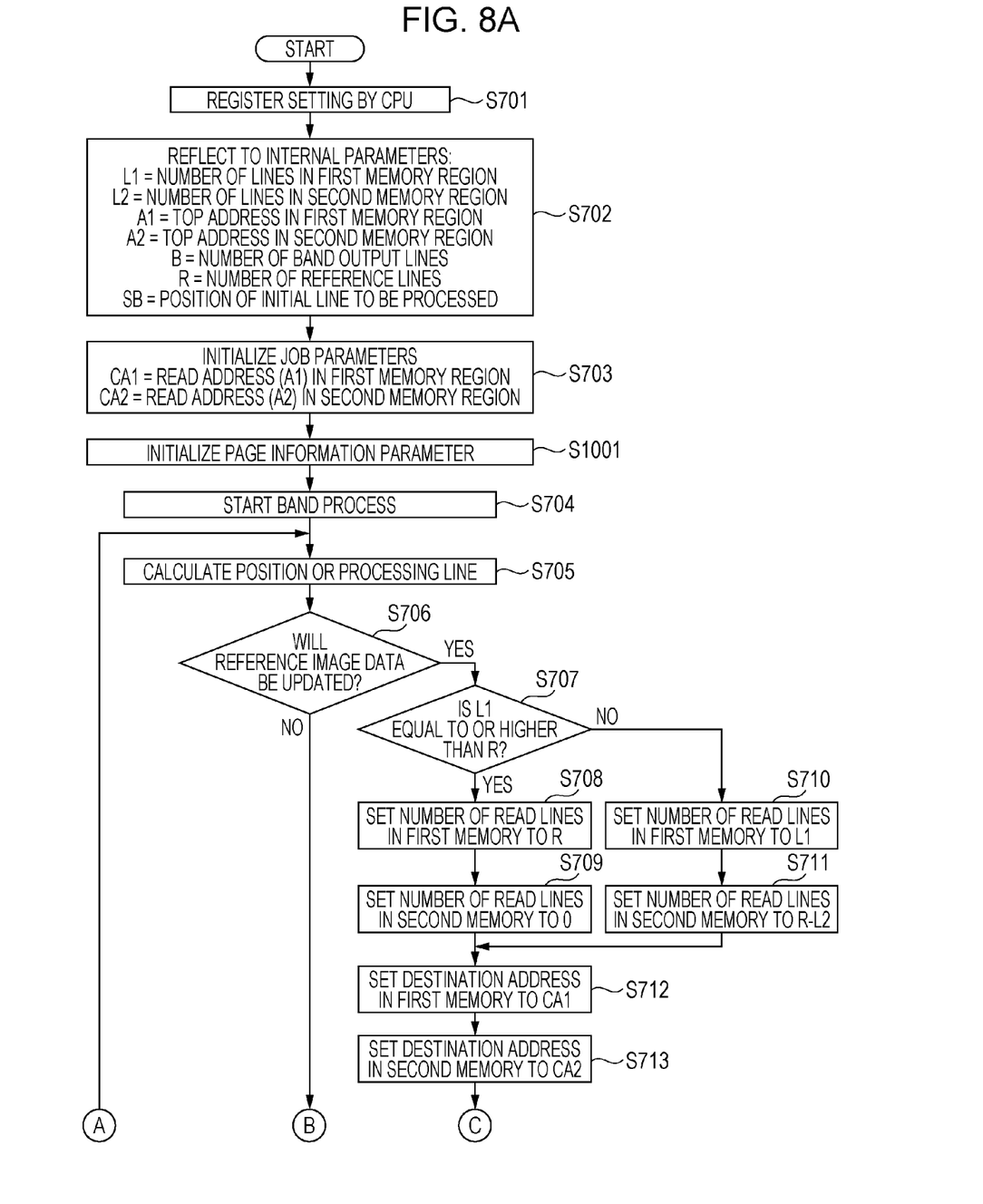
FIGS. 8A and 8B are flowcharts illustrating control over line management to be performed in data supply performed by data processing unit 407 according to the second embodiment.
Figure 8B:
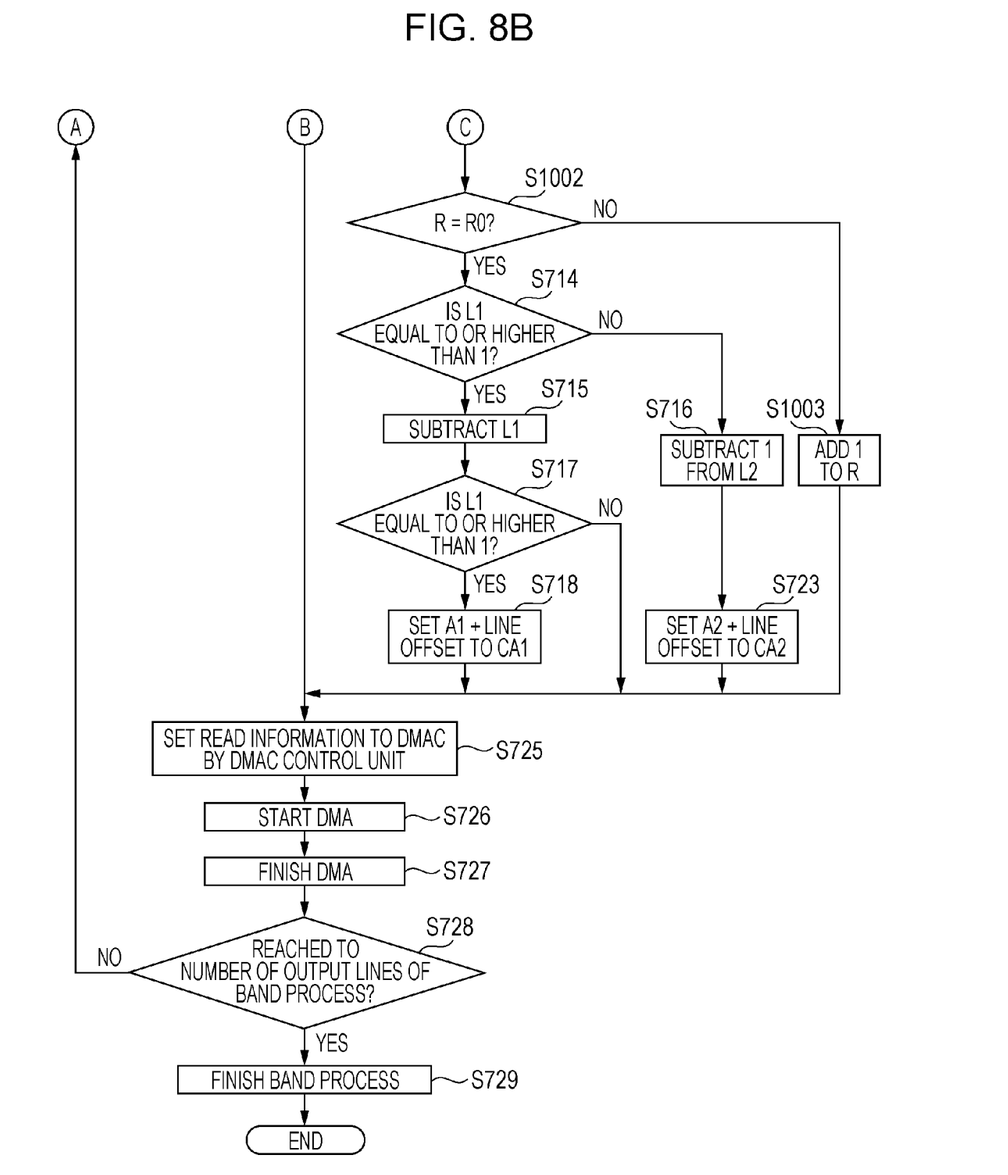
Figure 9:
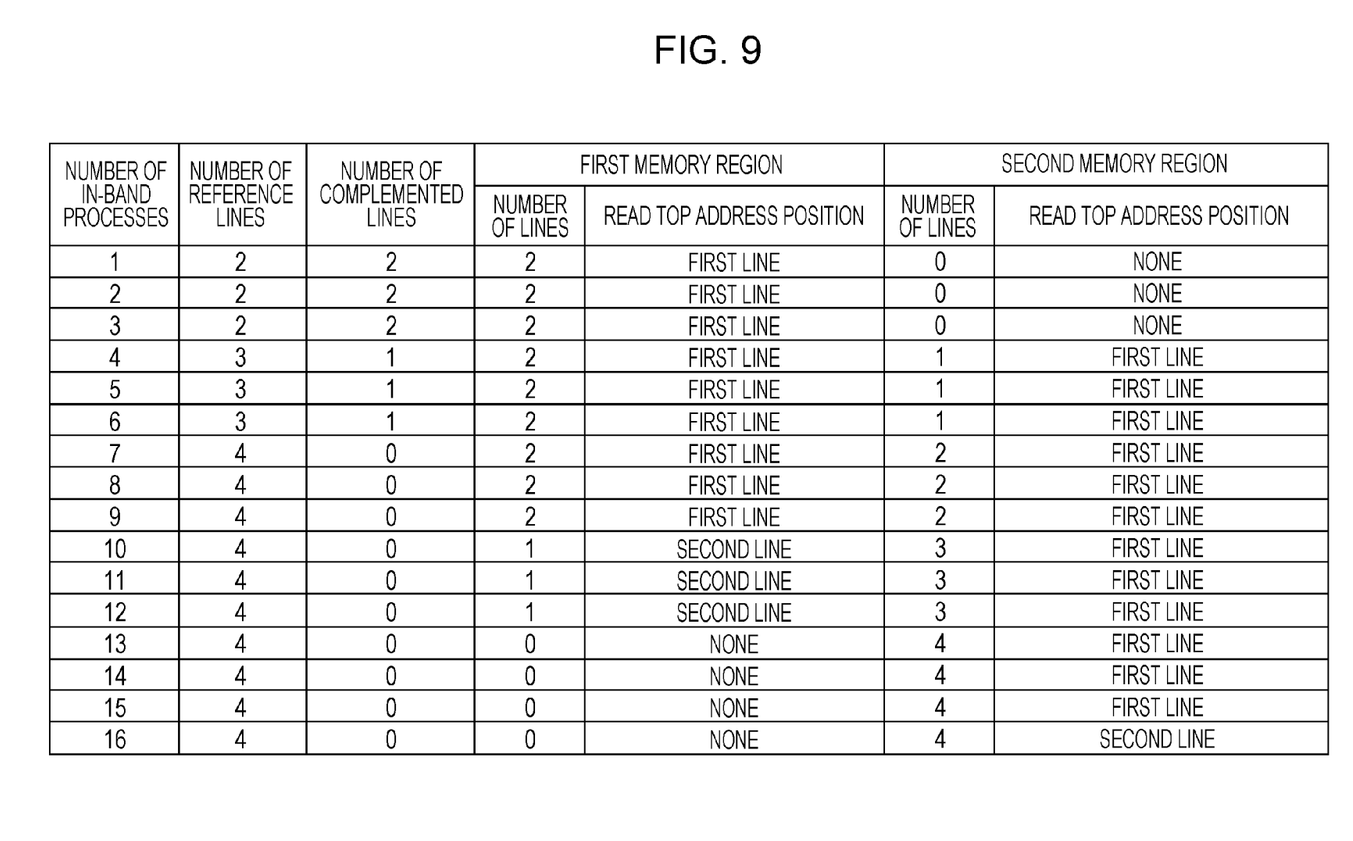
FIG. 9 illustrates the number of lines to be read from a memory and the position of a read top address for processing on image data according to the second embodiment.

FIGS. 7 to 9 illustrate image processing according to a second embodiment. This embodiment will be described with focus on differences from the first embodiment, and repetitive description will be omitted.

According to the first embodiment, continuous image data such as the image data 601 in FIG. 4 have been described as an example of image data that cross memory regions (first memory region 602 and second memory region 603). According to this embodiment, when original image data contain a line of entirely white data, the line may not be transmitted from a host computer, or a lower transfer band is used for such white data between a host computer and a printer.

A case where five lines of white data 902 exist between valid image data as in image data 901 in FIG. 7, for example. Because white data 902 is not actually transferred to a memory region, invalid data for the white data 902 exists from viewpoint of memory management. For example, in memory management, a region for 16 lines in the first memory region 602 stores a valid image data for the upper 9 lines and invalid data 903 for the meddle 5 lines, and valid data (905) for the lower 2 lines. An image containing the reference lines 905 for valid data may be processed by defining the upper 2 lines as white data and the lower 2 lines as the two reference lines 905 and by referring to the half valid reference line 905. In this case, white data in the upper two lines are not read out from memory but may be automatically generated within an image process to complement white data so that data of two reference lines may be read out to efficient supply and process the data. According to this embodiment, top and bottom sections of image data, that is, sections not partially containing reference lines may undergo the processing for complementing white data to perform an enlargement process in units of bands. In other words, the number of lines to be read out from the reference lines by the complementing processing may be variable.

For example, in a case where an enlargement process is to be performed on the subject band 904 in FIG. 7, seven lines of image data are to be referred, and upper two lines of the image data correspond to the first memory region (905), and the lower five lines correspond to the second memory region (906). In other words, only the second line and the third line within subject band 904 are not continuous in memory address on the subject band 904.

Here, FIG. 7 illustrates a top pixel address 907 of the first memory region 602 in the subject band 904 and a top pixel address 908 of the second memory region 603. A line offset is the same as the line offset 609 in FIG. 4. Because the magnification is ×3, the initial line position of the line-of-target position in the subject band 904 may be selected from line positions 508, 509, and 510 in FIG. 3. According to this embodiment, however, the line position 508 is selected as the initial line position, like the first embodiment. The CPU 404 in FIG. 1 sets information that the subject band 904 is at the top of image data to the image data information storage unit 107 before a band process is started.

FIGS. 8A and 8B illustrate a control flow with focus on line management. The control flow in FIGS. 8A and 8B further include steps S1001, S1002 and S1003 in addition to the control flow in FIGS. 5A and 5B. In the control flow in FIGS. 8A and 8B, data supply is implemented at a top position of image data by increasing the number of reference lines in accordance with the number of times of processing. First in step S701, the CPU 404 sets registers (106, 107, 108, 109, 110, 111, 116, and 117) within the data processing unit 407. In step S702, the CPU 404 reflects the register set values to internal parameters L1, L2, A1, A2, B, R, and SB. According to this embodiment, L1, L2, A1, A2, B, and SB are set like the first embodiment. However, the initial value R of the number of reference lines is not set to 4 but is set to 2. In step S1001, the normal number of reference lines, that is, the number of lines is set to R0 in a case where no white line exists. Here, value 4 is set to R0 by defining reference lines in a bicubic algorithm as normal reference lines. Because the subsequent flow from S704 to S713 is the same as that in FIGS. 5A, the description will be omitted.

In step S1002, the reference image data control unit 104 determines the present number of reference lines R is equal to R0 or not. If R is lower than R0, the flow proceeds to step S1003. If R=R0, the flow proceeds to step S714 where update processing on the number of lines and addresses to be read out is performed. In step S1003, the reference image data control unit 104 adds 1 to the reference line R, and the update processing on the number of lines and addresses to be read out will be skipped. Thus, in step S706, data across different memories if any at a top of image data may be supplied by increasing the number of reference lines R every time reference image data is determined to be updated.

FIG. 9 illustrates the number of lines to be read from a memory and the position of a read top address for reading out image data to be referred from memory, the number of reference lines and the number of complemented lines of valid data in the subject band 904 against the number of times of processing. As illustrated in FIG. 9, for any number of times of in-band processes, the sum of the number of reference lines and the number of complemented lines of valid data is equal to 4. Here, the term "the number of reference lines" refers to the number of lines to be read out from a memory region, and the term, "the number of complemented lines" refers to the number of lines of complement data generated by a complementing process.

Having described that, according to this embodiment, white data exists at a top of image data, the same is true for a case where white data exists at a bottom. More specifically, in order to handle such a case, information indicative of a bottom of image data may be set in the image data information storage unit 107, and R of reference lines may be decreased gradually depending on the subject line position.

According to this embodiment, even when reference image data is divided into two memory regions within a band, the data may be supplied to the enlargement processing unit, like the first embodiment. Thus, use of a DMAC may allow performing even image processing including referring image data in two memory regions in units of bands without involving a CPU in the middle of the processing and without requiring data copy on memory.

According to this embodiment, even when white data (complement data) which is not present on memory is generated, use of a DMAC allows performing band processing without involving a CPU in the middle of the processing. It further allows band processing to be performed without an increase of memory usage for data copy on memory.

Other Embodiments

Having described embodiments of the present subject matter above, it is not intended to limit a fundamental configuration of the present subject matter to any one of those described above. For example, according to the aforementioned embodiment, the magnification rate of an enlargement process is ×3. However, the magnification rate of an enlargement process is not particularly limited. Changing such a magnification may change the number of times of processing for updating in step S706. For some magnification rates, the line position may be fixed for crossing buffers.

According to the aforementioned embodiment, one enlargement process within a band may output enlarged image data line by line, for example. However, the same is true for a case where data are output by a plurality of lines simultaneously.

According to the aforementioned embodiment, among three options, the first line is used as the initial line position of the subject band 604. However, an embodiment is not limited thereto, but the second or the third line may be used instead. For example, when the second line is used, it may only require a shift of the timing for updating in step 706. For example, the updating may be executed not in the fourth process but in the third process. The result may be shifted by one process as a whole from the result in FIG. 6.

According to the aforementioned embodiment, the first data processing unit 407 performs an enlargement process on image data stored in the RAM 405 in accordance with a printing condition contained in a print job. However, a reduction process may be performed instead. In this case, the number of lines and the addressees of input data to be transferred from memory regions may be determined based on the position of the line of target and a given reduction rate (scaling factor).

According to the aforementioned embodiment, the number of buffers is 2, for example. However, the present subject matter is applicable as far as a memory configuration is provided in which image data to be referred by one band process are stored across memory regions. In other words, for example, a memory configuration may be provided in which image data to be referred by one time of band processing are stored across three or more buffers, and the buffers may be a ring buffer.

According to the aforementioned embodiment, a plurality of buffers are provided within the RAM 405. However, a plurality of RAMs may be prepared, and each of them may be handled as one buffer.

According to the aforementioned embodiment, a bicubic algorithm which refers four lines is applied as an enlargement process algorithm, for example. The present subject matter is not limited thereto but is applicable as far as a process is executed with reference to upper and lower pixels. For example, bilinear interpolation which refers two lines may be used as an enlargement process algorithm instead of bicubic interpolation.

According to the embodiment, an enlargement process has been described, for example. However, a data transfer method for image processing according to the present subject matter is not limited thereto. Any method may be applicable as far as upper and lower pixels are referred for performing processing and data are stored across memory regions. For example, image processing such as a reduction process and unsharp masking.

According to the aforementioned embodiment, an enlargement process has been described as an example of image processing. However, the present subject matter is not limited thereto but is applicable to any image process to be performed across bands.

According to the aforementioned embodiment, an inkjet printer is used, for example. However, the present subject matter is applicable to any apparatus performing an image process with reference to upper and lower pixels. Therefore, the image forming apparatus is not limited to an inkjet printer but may be any printer such as a laser printer and a copy machine and may be applicable to any other image forming apparatus such as a facsimile machine, a cellular phone, a PDA, an image viewer, and digital camera.

It may not be necessary to execute all of processes according to the aforementioned embodiment by hardware, but a part of the processes may be configured by software.

According to the present subject matter, the line-of-target position of data to be output may be identified, and from which position of a plurality of memory regions data are to be referred may be controlled in accordance with the identified line-of-target position. Thus, data divided into a plurality of memory regions may be supplied easily as a series of data.

Embodiment(s) of the present subject matter can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present subject matter has been described with reference to exemplary embodiments, it is to be understood that the claimed subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-147907, filed Jul. 16, 2013, which is hereby incorporated by reference herein in its entirety.

What is claimed is:

1. An apparatus which controls transfer of input data containing a plurality of lines stored across a plurality of memory regions including a first memory region and a second memory region to a processing unit, the apparatus comprising:

a specifying unit configured to specify a position of a line of target of output data containing a plurality of lines output from the processing unit;

a determining unit configured to determine a number of lines of input data to be transferred from the first memory region and their addresses and determine a number of lines of input data to be transferred from the second memory region and their addresses based on the position of the line of target specified by the specifying unit; and a control unit configured to control based on a determination result from the determining unit such that input data for a number of lines may be transferred from the first memory region and input data for a number of lines may be transferred from the second memory region.

2. The apparatus according to claim 1, further comprising:
a first storage unit configured to store information usable for identifying a number of lines of input data to be transferred from the first memory region based on a determination result from the determining unit;
a second storage unit configured to store information usable for identifying a top address of input data to be transferred from the first memory region based on a determination result from the determining unit;
a third storage unit configured to store information usable for identifying a number of lines of input data to be transferred from the second memory region based on a determination result from the determining unit;
a fourth storage unit configured to store information usable for identifying a top address of an input data to be transferred from the second memory region based on a determination result from the determining unit; and
an update unit configured to update at least one of the first storage unit, the second storage unit, the third storage unit, and the fourth storage unit based on the position of the line of target specified by the specifying unit.

3. The apparatus according to claim 1, wherein the determining unit determines the number of lines of input data to be transferred from the first memory region and their addresses and determines the number of lines of input data to be transferred from the second memory region and their addresses based on the position of the line of target specified by the specifying unit and a scaling factor if the processing unit performs scaling processing on the input data.

4. The apparatus according to claim 1, further comprising:
an obtaining unit configured to obtain information usable for identifying a line not containing valid data in the input data in a unit of processing of the input data,
wherein the specifying unit changes at least one of a number of lines of input data to be transferred from the first memory region and a number of lines of input data to be transferred from the second memory region based on information obtained by the obtaining unit and the position of the line of target specified by the specifying unit.

5. The apparatus according to claim 1, wherein the control unit is a Direct Memory Access Controller (DMAC) control unit and direct memory access (DMA) is employed in transferring the input data.

6. The apparatus according to claim 1,
wherein the input data includes a plurality of bands containing a plurality of lines, and
wherein the processing unit performs a process in units of band.

7. The apparatus according to claim 1, further comprising:
the processing unit.

8. The apparatus according to claim 1, wherein the input data are image data.

9. The apparatus according to claim 1, further comprising:
a printing unit configured to print an image based on the image data.

10. A data transfer control method for controlling transfer of input data containing a plurality of lines stored across a plurality of memory regions including a first memory region and a second memory region, the method comprising:
specifying a position of a line of target of output data containing a plurality of lines output;
determining a number of lines of input data to be transferred from the first memory region and their addresses and determining a number of lines of input data to be transferred from the second memory region and their addresses based on the position of the line of target specified; and
controlling based on a determination result such that input data for a number of lines may be transferred from the first memory region and input data for a number of lines may be transferred from the second memory region.

* * * * *